US012786972B2

(12) United States Patent
Shi et al.

(10) Patent No.: US 12,786,972 B2
(45) Date of Patent: Nov. 3, 2026

(54) METHODS, DEVICES, AND SYSTEMS FOR COLLISION RESOLUTION

(71) Applicant: ZTE Corporation, Shenzhen (CN)

(72) Inventors: Jing Shi, Shenzhen (CN); Xianghui Han, Shenzhen (CN); Wei Gou, Shenzhen (CN); Shuaihua Kou, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 319 days.

(21) Appl. No.: 18/520,944

(22) Filed: Nov. 28, 2023

(65) Prior Publication Data

US 2024/0098724 A1 Mar. 21, 2024

Related U.S. Application Data

(63) Continuation of application No. PCT/CN2022/086992, filed on Apr. 15, 2022.

(51) Int. Cl.

*H04W 72/0453* (2023.01)
*H04L 5/00* (2006.01)
*H04W 72/23* (2023.01)

(52) U.S. Cl.

CPC ....... *H04W 72/0453* (2013.01); *H04L 5/0094* (2013.01); *H04W 72/23* (2023.01)

(58) Field of Classification Search

CPC ............. H04W 72/0453; H04W 72/23; H04W 72/0446; H04W 72/232; H04W 72/231;

(Continued)

(56) References Cited

U.S. PATENT DOCUMENTS 11,792,774 B2 * 10/2023 Abotabl ................ H04L 5/0053 370/277
12,021,622 B2 * 6/2024 Abotabl .................. H04L 5/003

(Continued)

FOREIGN PATENT DOCUMENTS

CN 111615209 A 9/2020
CN 113824544 A 12/2021

(Continued)

OTHER PUBLICATIONS

Extended European Search Report regarding EP 22 93 6931 dated Jun. 6, 2024, 10 pages.

(Continued)

*Primary Examiner* — Abdullahi E Salad
(74) *Attorney, Agent, or Firm* — Crowell & Moring LLP

(57) ABSTRACT

The present disclosure describes methods, system, and devices for collision resolution in configuring time-frequency resource in a half-duplex and/or full-duplex telecommunication system. The method includes receiving, by a user equipment (UE), a first message which is used to resolve a collision between a first transmission in a first frequency resource region and a second transmission in a second frequency resource region, wherein the first and second transmissions overlap in a time domain; and determining, by the UE based on the first message, to transmit one of the first transmission and the second transmission, wherein transmission directions of the first transmission and the second transmission are different.

15 Claims, 12 Drawing Sheets

(58) Field of Classification Search
CPC ............... H04W 72/535; H04L 5/0094; H04L 27/26025
See application file for complete search history.

(56) References Cited

U.S. PATENT DOCUMENTS

| | | | | |
|---|---|---|---|---|
| 2016/0112167 | A1* | 4/2016 | Xu | H04L 5/0048 370/329 |
| 2016/0337805 | A1* | 11/2016 | Liao | H04W 8/005 |
| 2021/0105607 | A1* | 4/2021 | Loffe | H04W 68/005 |
| 2021/0352667 | A1 | 11/2021 | Abotabl et al. | |
| 2021/0377938 | A1* | 12/2021 | Huang | H04L 5/001 |
| 2021/0400709 | A1* | 12/2021 | Namjoshi | H04W 72/23 |
| 2022/0104245 | A1 | 3/2022 | Xu et al. | |
| 2022/0256583 | A1* | 8/2022 | Wang | H04L 5/0064 |
| 2023/0084917 | A1* | 3/2023 | Li | H04W 72/0446 370/329 |
| 2023/0094704 | A1* | 3/2023 | Ohara | H04W 74/0836 370/329 |
| 2023/0189232 | A1* | 6/2023 | Rastegardoost | H04B 1/713 370/329 |
| 2024/0163843 | A1* | 5/2024 | Hong | H04W 76/19 |

FOREIGN PATENT DOCUMENTS

| | | | |
|---|---|---|---|
| WO | WO 2022017358 | A1 | 1/2022 |
| WO | WO 2022067173 | A1 | 3/2022 |

OTHER PUBLICATIONS

NTT DOCOMO et al., "Outcome of email thread [l00e-NR-TEICRs-02]," 3GPP Draft, R1-2001232, 3rd Generation Partnership Project (3GPP), Mobile Competence Centre, France, vol. RAN WG1, No. e-Meeting; Feb. 24, 2020-Mar. 6, 2020, Mar. 4, 2020, XP052344297, 28 pages. Retrieved from the internet: https://ftp.3gpp.org/tsg_ran/WG1_RL1/TSGRI_I00_e/Docs/RI-2001232.zip RI-2001232Summary on email discussion2_7.2.12.docx.

Zte et al., "On Evolution of Duplex Operation in Rel-18," 3GPP Draft, RP-213396, 3rd Generation Partnership Project (3GPP), Mobile Competence Centre, France, vol. TSG RAN, No. Electronic Meeting, Dec. 6, 2021-Dec. 17, 2021, Nov. 29, 2021, XP052097483, 2 pages. Retrieved from the Internet: https://ftp.3gpp.org/tsg_ran/TSG_RAN/TSGR_94e/Docs/RP-213396.zip RP-213396 OnEvolution of Duplex Operation in Rel-18.docx.

International Search Report and Written Opinion regarding PCT/CN2022/086992 dated Dec. 15, 2022, 6 pages.

Korean-language Office Action with English summary issued in Application No. 10-2023-7042663 dated Dec. 17, 2025, (10 pages).

* cited by examiner

METHODS, DEVICES, AND SYSTEMS FOR COLLISION RESOLUTION

CROSS-REFERENCE TO RELATED APPLICATION

This application is a continuation application of PCT International Patent Application No. PCT/CN2022/086992, filed with the China National Intellectual Property Administration, PRC on Apr. 15, 2022, which is herein incorporated by reference in its entirety.

TECHNICAL FIELD

The present disclosure is directed generally to wireless communications. Particularly, the present disclosure relates to methods, devices, and systems for collision resolution.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, a half-duplex and/or a full-duplex technology may be an important feature to further improve efficiency and performance of the new generation mobile communication technology. The half-duplex or full-duplex technology may enable half-duplex or full duplex with time-frequency resources. There are problems/issues associated with implementing the half-duplex and/or full-duplex technology. For example, in a sub-band defined for achieving the sub-band non-overlapping full duplex at the base station side, the downlink and uplink transmission may have collisions in the sub-band and original transmission.

The present disclosure describes various embodiments for collision resolution in configuring time-frequency resource, which may address at least one of issues/problems associated with the existing system, particularly solving the issues/problems related to the downlink and uplink transmission collisions, thus improving the efficiency and/or performance of the wireless communication.

SUMMARY

This document relates to methods, systems, and devices for wireless communication, and more specifically, for collision resolution in configuring time-frequency resource in a half-duplex and/or full-duplex telecommunication system. The various embodiments in the present disclosure may include a new time-frequency resource and frame structure configuration method, which is beneficial to improve the transmission collisions between uplink and downlink configuration and/or transmission, to increase the resource utilization efficiency, and to boost latency performance of the wireless communication, including but not limited to, ultra-reliable low latency communication (URLLC).

In one embodiment, the present disclosure describes a method for wireless communication. The method includes receiving, by a user equipment (UE), a first message which is used to resolve a collision between a first transmission in a first frequency resource region and a second transmission in a second frequency resource region, wherein the first and second transmissions overlap in a time domain; and determining, by the UE based on the first message, to transmit one of the first transmission and the second transmission, wherein transmission directions of the first transmission and the second transmission are different.

In one embodiment, the present disclosure describes a method for wireless communication. The method includes sending, by a base station, a first message which is used to resolve a collision between a first transmission in a first frequency resource region and a second transmission in a second frequency resource region; and wherein: one of the first transmission and the second transmission is transmitted based on the first message, and the first and second transmissions overlap in a time domain, and transmission directions of the first transmission and the second transmission are different.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

Figure 1A:
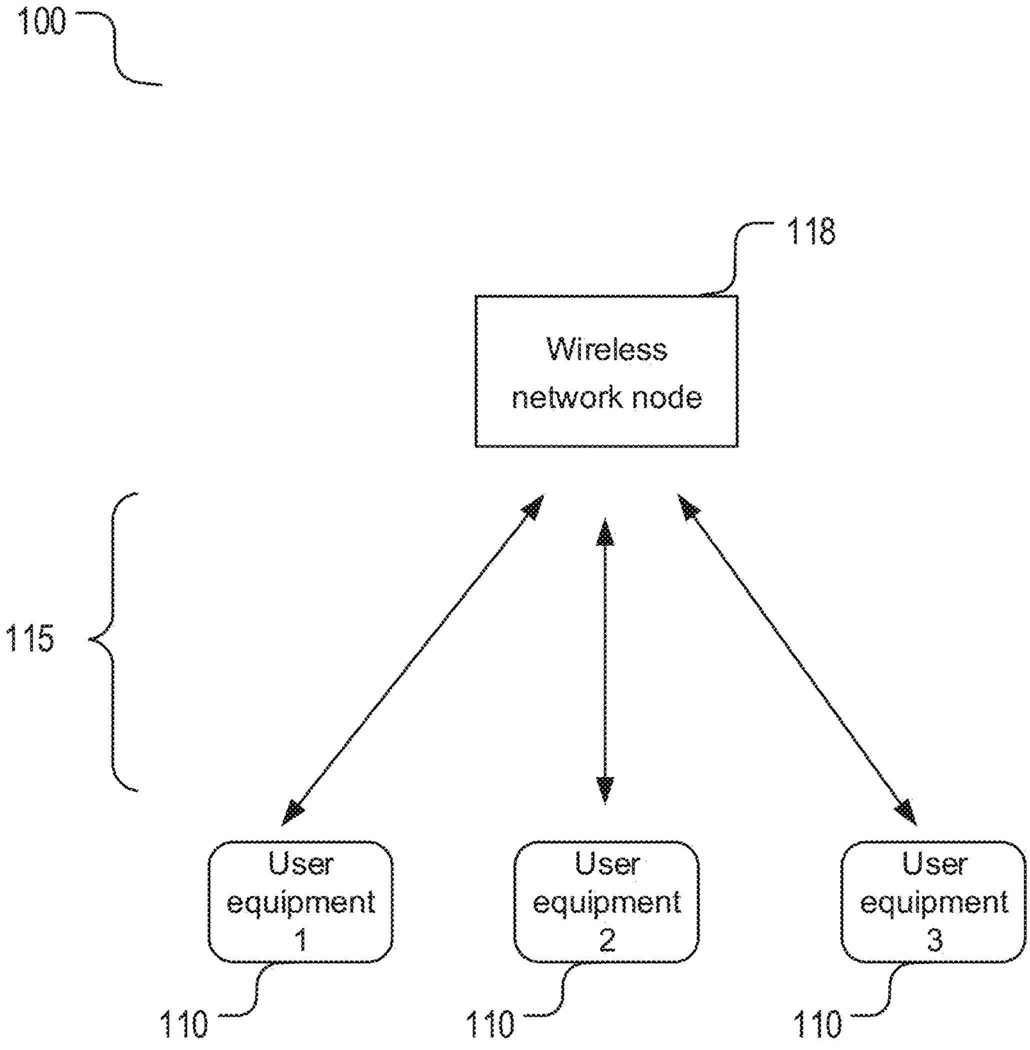
FIG. 1A shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for collision resolution in configuring time-frequency resource.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

With the rapid evolution of cellular mobile communication systems, a half-duplex and/or a full-duplex technology may be an important feature to further improve efficiency and performance of the new generation mobile communication technology. The half-duplex or full-duplex technology may enable half-duplex or full duplex with time-frequency resources. There are problems/issues associated with implementing the half-duplex and/or full-duplex technology. One of the problems/issues may include the time-frequency resource configuration under the half-duplex and/or full-duplex technology.

In some implementations, some 4th Generation mobile communication technology (4G) long-term evolution (LTE) or LTE-advance (LTE-A) and some 5th Generation mobile communication technology (5G) may face more and more demands.

In some implementations, 4G and 5G systems may support on features of enhanced mobile broadband (eMBB), ultra-reliable low-latency communication (URLLC), and/or massive machine-type communication (mMTC). Thus, a full duplex may be a requirement for 5G and further communication system.

In some implementations, the full duplex technology may enable full duplex with different frequency resources at a same time in the time domain (i.e., same slot). In some other implementations, half duplex (HD) mode, i.e., only transmitting or receiving at a certain time, may be utilized in order to avoid increasing implementation complexity. For example, in a time division duplex (TDD) system, TDD spectrum resources may be divided into downlink (DL) and uplink (UL) in the time domain in order to transmit uplink data and downlink data. Thus, for a traditional TDD system, only uplink or downlink may be performed in each period. In order to further improve the efficiency of TDD systems, it may support full duplex for a TDD system, so that the TDD system is able to support both uplink and downlink in each period in the time domain.

In some implementations with some wireless communication system, the time domain resource may be split between downlink (DL) and uplink (UL) in TDD. Allocation of a limited time duration for the uplink in TDD would result in reduced coverage, increased latency and reduced capacity.

In some implementations, it may be feasible to allow the simultaneous existence of downlink and uplink, a.k.a. full duplex, as an enhancement on this limitation of the conventional TDD operation. Specifically, in some implementations, the full duplex may include a sub-band non-overlapping full duplex (SBFD) at a nodeB (NB, e.g., a gNB) side within a conventional TDD band. In some implementations, the sub-band may be defined for achieving the sub-band non-overlapping full duplex, collision resolution may be designed to resolving the downlink and uplink collision between the transmission in the sub-band and original transmission.

In various embodiments for resolving the downlink and uplink collision between the transmission in the sub-band and original transmission, an enhanced collision resolution mechanism of intra-band HD carrier aggregation (CA) may be used to achieve SBFD. In some implementations, two cells in intra-band CA may be used to achieve the SBFD; an original carrier (or DL bandwidth part (BWP), or DL&UL BWP) may be regarded as one cell, the sub-band may be regarded as another cell, and the enhanced collision resolution mechanism of intra-band HD CA may be used.

In some implementations, each of the cell may be refer to a frequency resource region, which includes a plurality of slots (or symbols). The present disclosure may be either described on a slot level, or described on a symbol level. In the present disclosure, various embodiments may be described, as non-limiting examples, at the slot level, which may be applicable to the symbol level as well.

Each slot or symbol in each cell may be any one of the following types: a semi-static slot format indication downlink (semi SFI D) slot or symbol, or a semi-static slot format indication uplink (semi SFI U) slot or symbol, or a radio resource control uplink (RRC U) slot or symbol, or a radio resource control downlink (RRC D) slot or symbol, or a dynamic uplink (dynamic U) slot or symbol, or a dynamic downlink (dynamic D) slot or symbol.

In some implementations, scenarios, that are mainly to be resolved, based on HD CA to achieve SBFD, include a semi SFI U collision with a semi SFI D, or a RRC U collision with a semi SFI D/RRC D. The scenario of dynamic U collision with dynamic D, a wireless network may be configured to avoid Dynamic D/U collision.

In some implementations, for the case of a semi SFI U collision with a semi SFI D in intra-band HD CA, it may be an error case in intra-band, as shown in Table 1. When a sub-band/sub-BWP/virtual-BWP/CFR (or using sub-band to represent sub-band/sub-BWP/virtual-BWP/CFR) achieved by a reference/other cell, includes a Semi SFI U, it may not be an error case. Further, when it can be specified like inter-band, always dropping one cell may not be reasonable due to actual traffic consideration, such as capacity/latency/coverage/etc.

Figure 1B:
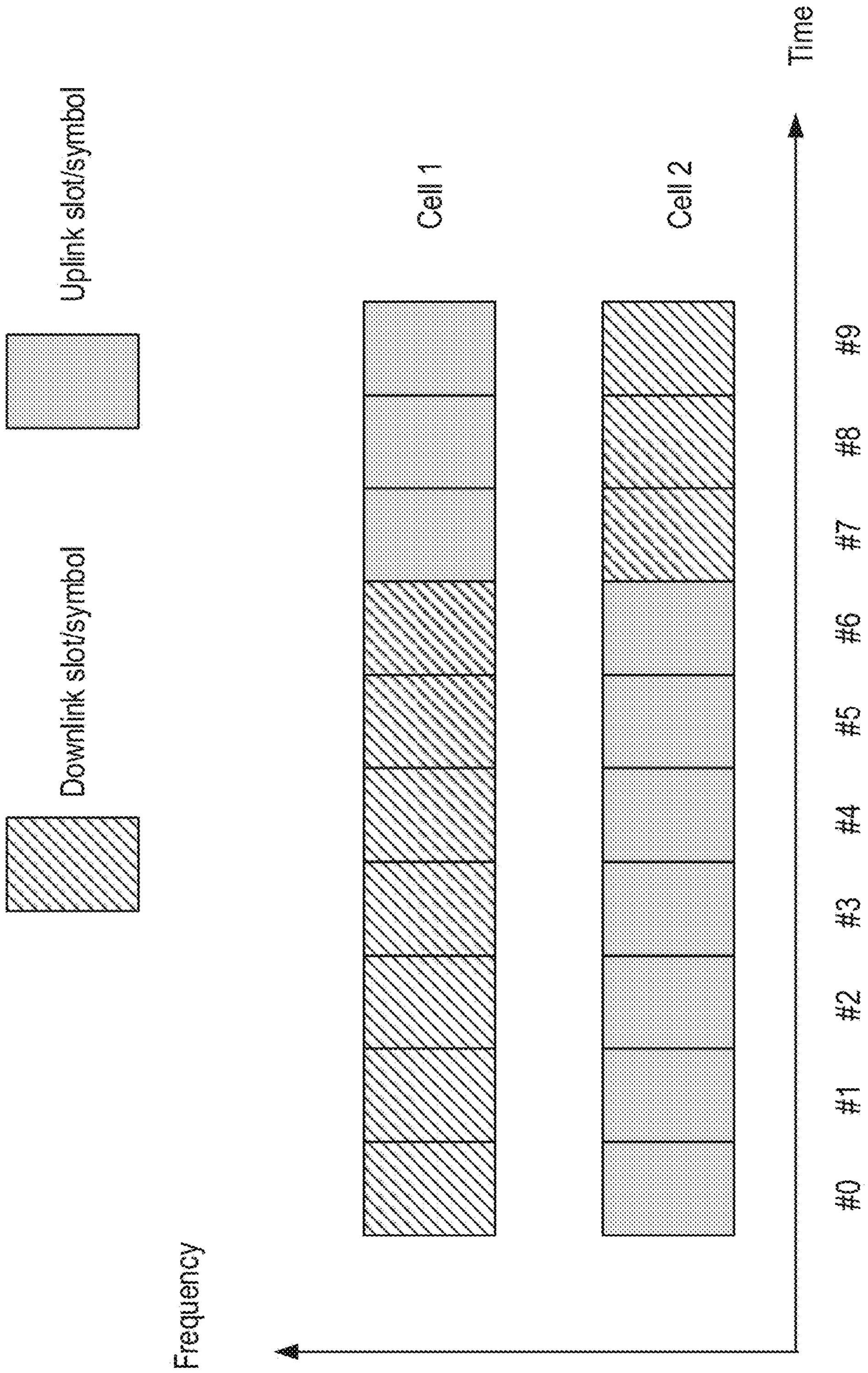
FIG. 1B shows a schematic diagram of an exemplary embodiment for wireless communication.
Figure 1C:
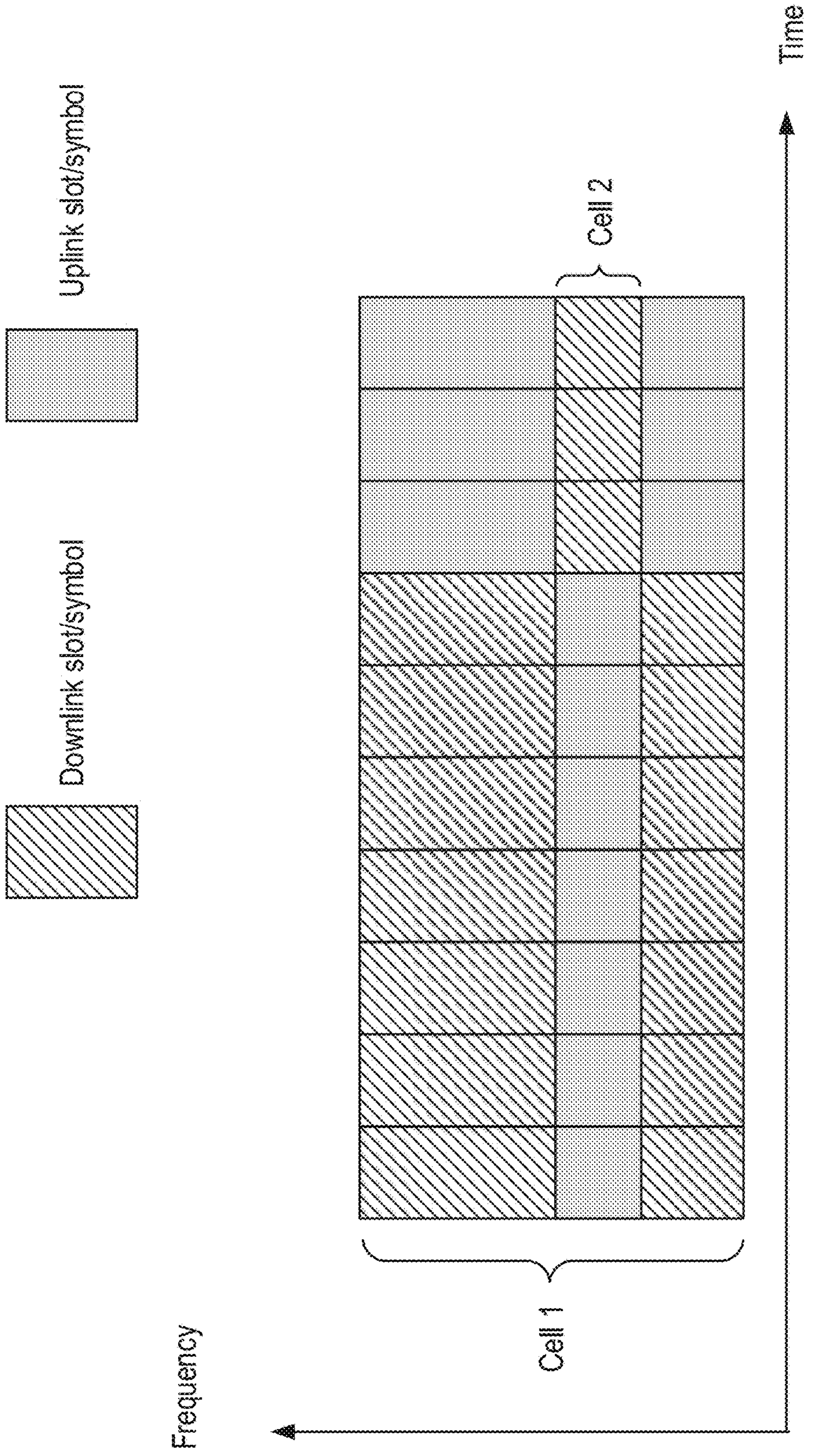
FIG. 1C shows a schematic diagram of an exemplary embodiment for wireless communication.

FIGS. 1B and 1C show some non-limiting examples for CA-SBFD achieved by a cell 1 (or cell #1) and a cell 2 (or cell #2), wherein with intra-band CA cell #1 and cell #2, sub-band is achieved by cell #2. Each of cell #1 and/or cell #2 include a plurality of slots or symbols, for example, slot #0, slot #1, slot #2, slot #3, . . . , and/or slot #9. Assume all the D/U in FIG. 1B is Semi SFI D/U, then based on case 1 and/or 4 in Table 1, cell #2 may be always dropped, then the sub-band will be never used. In some implementation, in response to the reference cell being Semi SFI D in a slot/symbol, the overlapped U resource in the configured sub-band (cell #2) may not be used, which leads to useless of CA-SBFD (regardless dynamic scheduling or configured grant for cell #2). In some implementations, as shown in FIG. 1C, the cell 1 may overlap with the cell 2 in the frequency domain, wherein cell 1 has a larger frequency range and encloses completely a frequency range of the cell 2.

TABLE 1

| case | Ref cell | Other cell | UE behavior | Note |
|---|---|---|---|---|
| 1 | Semi SFI D | Semi SFI U | Allowed to drop U for inter-band<br>Error case in intra-band | Dropping U on other cell<br>Error case in intra-band |
| 4 | Semi SFI U | Semi SFI D | Allowed to drop D for inter-band<br>Error case in intra-band | Dropping D on other cell<br>Error case in intra-band |

In some implementation, for example case 2 or 7 or 8 or 11 in Table 2, when a sub-band achieved by reference/other cell is an RRC U, always dropping one cell may not be suitable, especially when the sub-band is configured based on the Semi SFI F. For example, CG-PUSCH/semi-PUCCH on RRC U may be transmitted or dropped in different cases depends on the cell type (the reference cell or the other cell).

Referring to FIG. 1B, with intra-band CA cell #1 and cell #2, and sub-band is achieved by cell #2. Based on case 2 or 7, when the D/U in FIG. 1B is Semi SFI D or RRC D/U, cell #2 may be always dropped, and then the sub-band may be never used. In some implementations, the reference cell may be Semi SFI D or RRC D in a slot/symbol, the overlapped U resource in the configured sub-band (cell #2) may not be used, which leads to CG-PUSCH/semi-PUCCH on RRC U may be always dropped due to the type of sub-band (cell #2) is other.

TABLE 2

| case | Ref cell | Other cell | UE behavior | Note |
|---|---|---|---|---|
| 2 | Semi SFI D | RRC U | Allowed to drop U | Dropping on other cell |
| 7 | RRC D | RRCU | Allowed to drop U | Dropping on other cell |
| 8 | RRC U | RRCD | Allowed to drop D | Dropping on other cell |
| 11 | RRC U | Semi SFI D | Allowed to drop D | Dropping on other cell |

In some implementations, the UE determines a reference cell (Ref cell) for a symbol as an active cell with the smallest cell index among serving cells.

In various embodiments in the present disclosure, the semi SFI D and U may include D and U symbols configured by TDD-UL-DL-ConfigurationCommon, or TDD-UL-DL-ConfigDedicated. The semi SFI F may include flexible symbols configured by TDD-UL-DL-ConfigurationCommon, or TDD-UL-DL-ConfigDedicated, when are provided to a UE, or when TDD-UL-DL-ConfigurationCommon and TDD-UL-DL-ConfigDedicated are not provided to the UE. The RRC D may include symbols corresponding to a higher-layer configured PDCCH, or a PDSCH, or a CSI-RS on semi SFI F of the same cell. The RRC U may include symbols corresponding to a higher-layer configured SRS, or PUCCH, or PUSCH, or PRACH on semi SFI F of the same cell. The dynamic D and U may include symbols scheduled as D and U by DCI formats other than DCI format 2_0 on semi SFI F of the same cell.

In some implementations, based on HD CA to achieve SBFD, scenarios that are mainly to be resolved include semi SFI U collision with semi SFI D, or RRC U collision with semi SFI D/RRC D. The enhanced collision resolution mechanism are described in various embodiments in the present disclosure.

The various embodiments and implementations described in the present disclosure include collision resolutions in configuring time-frequency resource in a half-duplex and/or full-duplex telecommunication system, which is beneficial to improve the interference between the uplink and the downlink transmissions, and also improve the efficiency of resources as much as possible.

FIG. 1A shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115 for downlink/uplink communication. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 2:
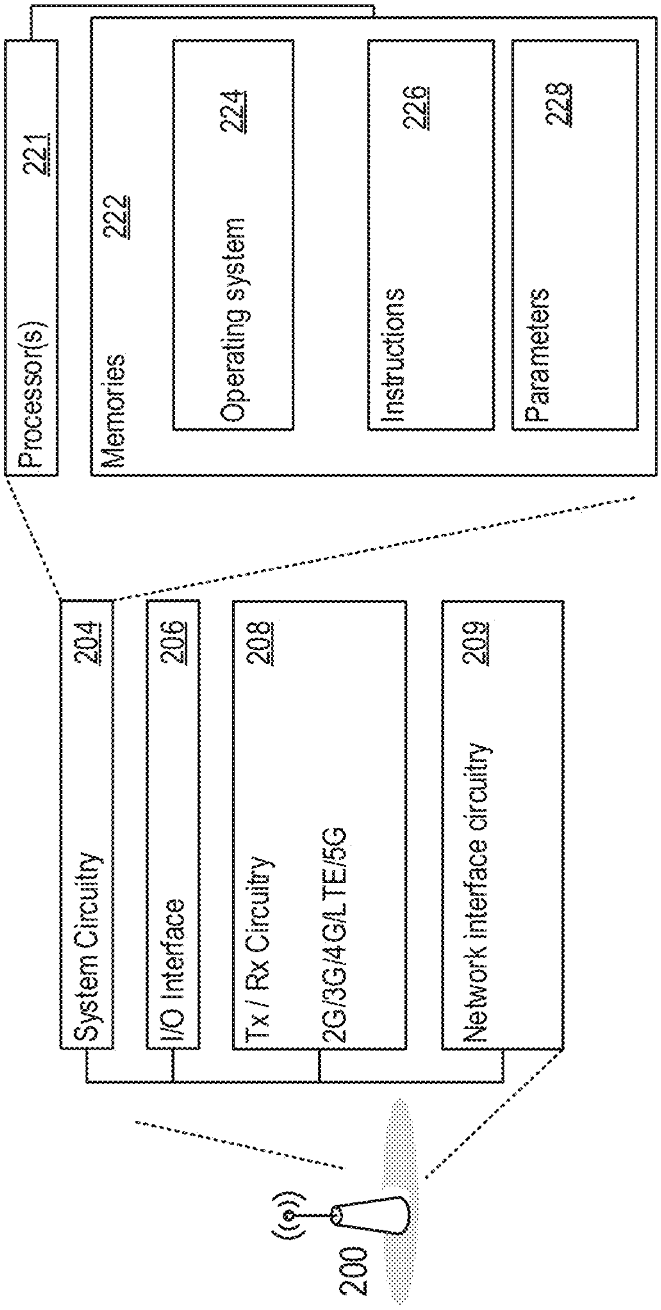
FIG. 2 shows an example of a network node.

FIG. 2 shows an example of electronic device 200 to implement a network base station. The example electronic device 200 may include radio transmitting/receiving (Tx/

Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
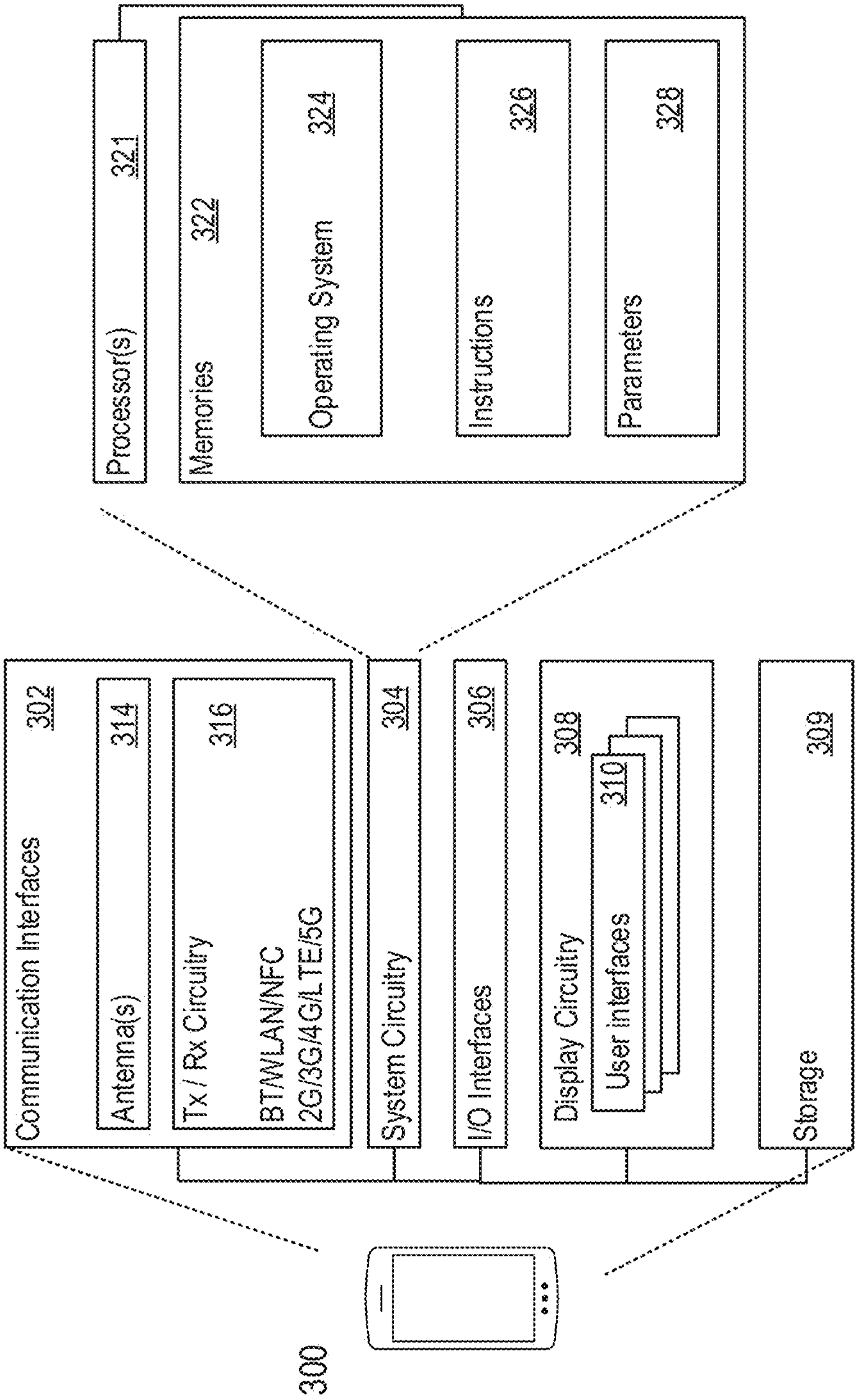
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G standards, and/or 6G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, or other data that the UE 300 will send, or has received, through the communication interfaces 302. In various implementations, a system power for the UE 300 may be supplied by a power storage device, such as a battery or a transformer.

The present disclosure describes various embodiment for collision resolution in configuring time-frequency resource in a half-duplex and/or full-duplex telecommunication system, which may be implemented, partly or totally, on the network base station and/or the user equipment described above in FIGS. 2-3. The various embodiments in the present disclosure may enable efficient time-frequency resource configuration in a half-duplex and/or full-duplex telecommunication system, which may reduce gNB's and/or UE's implementation complexity, increase the resource utilization efficiency, and/or boost latency performance of URLLC traffic.

Figure 4A:
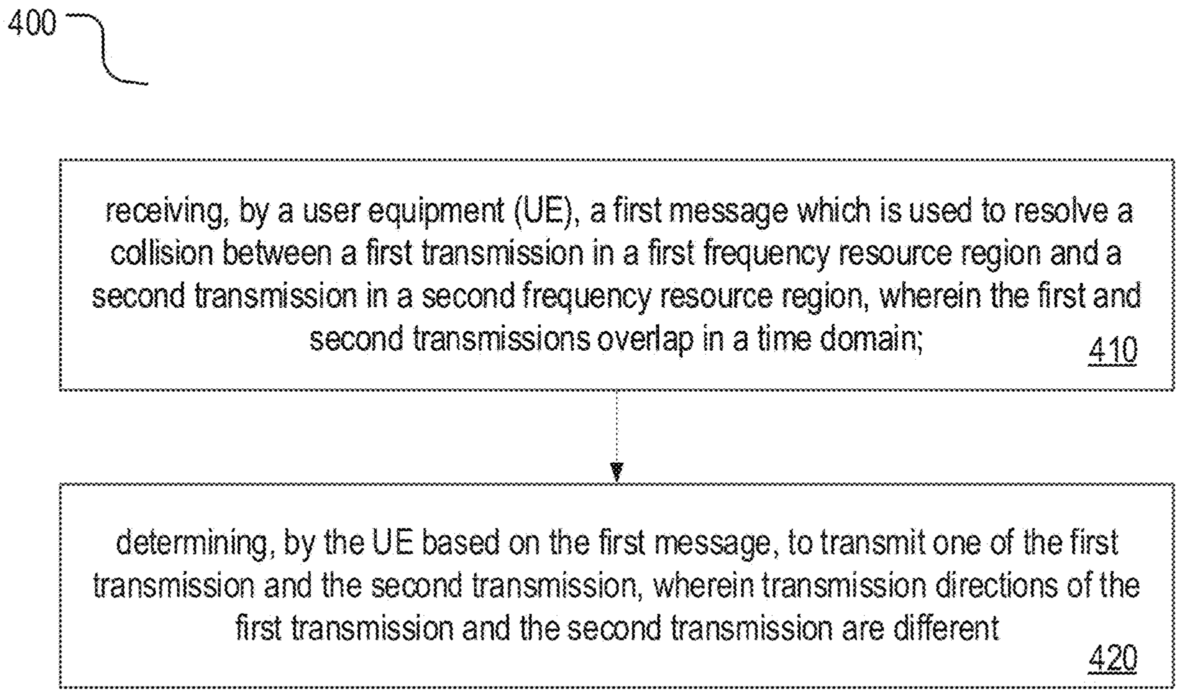
FIG. 4A shows a flow diagram of a method for wireless communication.

Referring to FIG. 4A, the present disclosure describes various embodiments of a method 400 for wireless communication. The method 400 may include a portion or all of the following steps: step 410, receiving, by a user equipment (UE), a first message which is used to resolve a collision between a first transmission in a first frequency resource region and a second transmission in a second frequency resource region, wherein the first and second transmissions overlap in a time domain; and/or step 420, determining, by the UE based on the first message, to transmit one of the first transmission and the second transmission. Transmission directions of the first transmission and the second transmission are different.

Figure 4B:
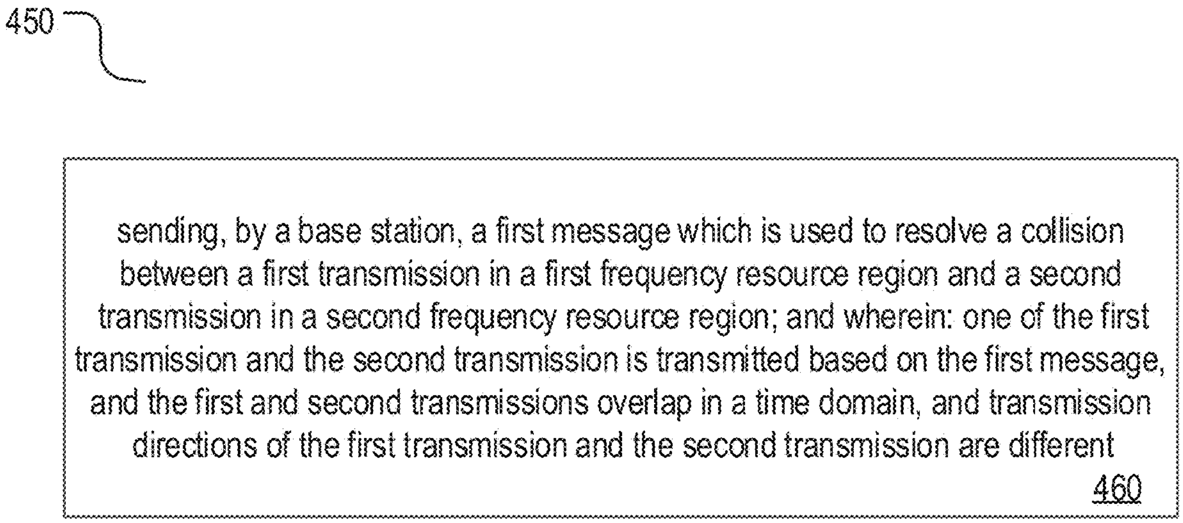
FIG. 4B shows a flow diagram of another method for wireless communication.

Referring to FIG. 4B, the present disclosure describes various embodiments of a method 450 for wireless communication. The method 450 may include step 460, sending, by a base station, a first message which is used to resolve a collision between a first transmission in a first frequency resource region and a second transmission in a second frequency resource region; and wherein: one of the first transmission and the second transmission is transmitted based on the first message, and the first and second transmissions overlap in a time domain, and transmission directions of the first transmission and the second transmission are different.

In some implementations, the frequency resource region may be referred to a cell, a sub-band, or the like. In some other implementations, sub-band may be referred to represent a sub-band, a sub-BWP, a virtual-BWP, a common frequency resource (CFR), or the like.

In some implementations, the method 400 and/or 450 may include determining, by the UE, whether to drop the first transmission or second transmission; in response to determining to drop the second transmission, dropping, by the UE, the second transmission and keeping the first transmission; and/or in response to determining to drop the first transmission, dropping, by the UE, the first transmission and keeping the second transmission.

In some implementations, the first transmission comprises at least one of a semi-static slot format indication uplink (semi SFI U) slot or symbol, a semi-static slot format indication downlink (semi SFI D) slot or symbol, a radio resource control uplink (RRC U) slot or symbol, or a radio resource control downlink (RRC D) slot or symbol; and/or the second transmission comprises at least one of a semi SFI U slot or symbol, a semi SFI D slot or symbol, a RRC U slot or symbol, or a RRC D slot or symbol.

In some implementations, the first message comprises a frequency resource region pattern for a set of slots or symbols, wherein the frequency resource region pattern indicates, for each of the set of slots or symbols, a reference frequency resource region between the first frequency resource region and the second frequency resource region. In some implementations, more than two frequency resource regions may be included; the frequency resource region pattern may indicate a reference frequency resource region among the multiple frequency resource regions.

In some implementations, the frequency resource region pattern is configured based the slots or symbols with different direction between the frequency resource regions, or based the slots or symbols with overlapped semi-static transmissions with different direction.

In some implementations, the frequency resource region pattern comprises a pattern bitmap and the pattern is sent only on a frequency resource region, wherein each unit of the pattern bitmap indicates the frequency resource region at a corresponding slot or symbol.

In some implementations, each unit of the pattern bitmap comprises one of: a first value indicating the first frequency resource region at the corresponding slot or symbol is the reference frequency resource region, or a second value indicating the second frequency resource region at the corresponding slot or symbol is the reference frequency resource region.

In some implementations, in response to a subcarrier spacing (SCS) of a frequency resource region being smallest among the frequency resource regions, or a frequency resource region being configured with a subslot and a length of the subslot being shortest among the frequency resource regions, the frequency resource region pattern is configured based on a slot or symbol configuration of the frequency resource region.

In some implementations, the frequency resource region pattern comprises a pattern bitmap on each frequency resource region, wherein each bit of the pattern bitmap indicates whether the each frequency resource region at a corresponding slot or symbol is the reference frequency resource region.

In some implementations, each bit of the pattern bitmap comprises one of: a 0-bit indicating the corresponding frequency resource region at the corresponding slot or symbol is not the reference frequency resource region, or a 1-bit indicating the corresponding frequency resource region at the corresponding slot or symbol is the reference frequency resource region.

In some implementations, the first message indicates a frequency resource region pattern, or indicates a frequency resource region pattern in a set of pre-configured frequency resource region patterns, or indicates a frequency resource region as a reference frequency resource region; and the first message is a DCI or MAC CE.

In some implementations, the frequency resource region pattern is further indicated with a period of a set of slots or symbols, the frequency resource region pattern indicates the reference frequency resource region within the period for each of the set of slots or symbols, or the frequency resource region pattern is valid within a duration, and a start of the duration is predefined or indicated by the first message, or the frequency resource region pattern is one of the set of pre-configured frequency resource region patterns comprising more than one pre-configured frequency resource region patterns, or the frequency resource region as the reference frequency resource region is indicated at a time being valid with an offset corresponding to a channel carrying the first message, a traffic channel, or a feedback channel scheduled by the channel carrying the first message, wherein the offset is predefined or comprised in the first message.

In some implementations, the first message indicates whether to transmit the first transmission or the second transmission, wherein the first message is a DCI for activation or deactivation of the first transmission or the second transmission.

In some implementations, in response to the second frequency resource region being configured within the first frequency resource region, a type of resource in the second frequency resource region is determined by one of following: the resource in the second frequency resource region is semi-static uplink slot or symbol, or the resource in the second frequency resource region is semi-static flexible slot or symbol, or the resource in the second frequency resource region is semi-static uplink or flexible slot or symbol when corresponding same slot or symbol on the first frequency resource region is semi-static downlink or flexible slot or symbol, respectively.

In some implementations, the UE receives a DCI indicating an SFI; and a first collision resolution for a half-duplex UE configured with more than one frequency resource regions comprises one of the following: to transform downlink or uplink indicated by the SFI to one of current type of transmission direction, and to use a second collision resolution, or as a new type for downlink or uplink indicated by the SFI, and to predefine the first collision resolution between the new type and each of current types of transmission direction.

In some implementations, the UE receives a DCI indicating an SFI and the frequency resource region pattern remains unchanged.

In some implementations, the UE receives a DCI indicating an SFI; and the frequency resource region pattern is changed by one of following: being updated with a second frequency resource region pattern indicated by the DCI, or being updated by invaliding the frequency resource region pattern on partial slots or symbols in the slots or symbols indicated to uplink or downlink slots or symbols by the DCI, or being updated by replacing the frequency resource region pattern on partial slots or symbols to the frequency resource region comprising the slots or symbols indicated to uplink or downlink slots or symbols by the DCI.

In some implementations, the UE receives a second message indicating an SFI; and in response to the sub-band pattern including any semi SFI F slot or symbol, the sub-band pattern is updated by replacing a portion of the sub-band pattern corresponding to the semi SFI F slot or symbol to indicate the reference sub-band as the sub-band comprising at least one slot or symbol specified by the SFI. In some implementations, the second message may include a DCI with a format 2_0.

First Set of Exemplary Embodiments

A Semi SFI U (RRC U) on the other cell may be transmitted when overlapped with a Semi SFI D (Semi SFI D or RRC D) on a reference cell. There may be several methods in various embodiments.

A first method may include a reference cell pattern (the pattern). The pattern is configured with all Semi SFI D/U with different direction among the cells, or also including the slots/symbols on the other cell with RRC U which overlapped with Semi SFI D or RRC D on reference cell. The pattern may be configured based on one cell (e.g., lowest SCS or index cell) or for each cell. The pattern may be determined by slot or symbol level or slot+symbols level M.

A second method may include dynamic indicating/switching reference cell. A group common downlink control information (GC-DCI) may include SFI liked indication within a period, or switching indication between/among two/multiple patterns. AUE-specific DCI may include indication without unicast scheduling, or a field for reference cell indication combined with a timeline.

A third method may include reference cell unchanged, additional pattern or additional collision mechanism, which may be further indicated by DCI.

The above one or more method may be combined in any order. For example, using the second method to additional update partial pattern, or using activation DCI to indicate DL SPS or CG PUSCH transmission.

For the case of semi SFI U collision with semi SFI D, configure reference cell pattern, furthermore, based on Semi SFI D/U slot/symbols overlapped different direction between two cells. For the case of RRC U collision with semi SFI D/RRC D, configure reference cell pattern to make partial slots/symbols for RRC U valid on cell #2 especially overlapped with Semi SFI D on cell #1.

Method 1: Reference Cell Pattern

Reference cell pattern may be needed especially for the frame structure cells used for CA-SBFD, which is configured with all Semi SFI D/U, or the other cell with RRC U being overlapped with Semi SFI D or RRC D on reference cell.

In some implementations, the reference cell pattern may be configured based on one cell, e.g., lowest index cell. The reference cell pattern may be indicated by a bitmap (e.g., 2 cells), or cell index/CIF for each slot (e.g., more than 2 cells). This may be referred as alternative 1.

In some implementations, the reference cell pattern may be configured based on each cell. This may be referred as alternative 2.

In some implementations, the slots/symbols selection may be based on semi SFI D/U with different direction or additionally based on semi SFI D/U with F among the cells.

Figure 5:
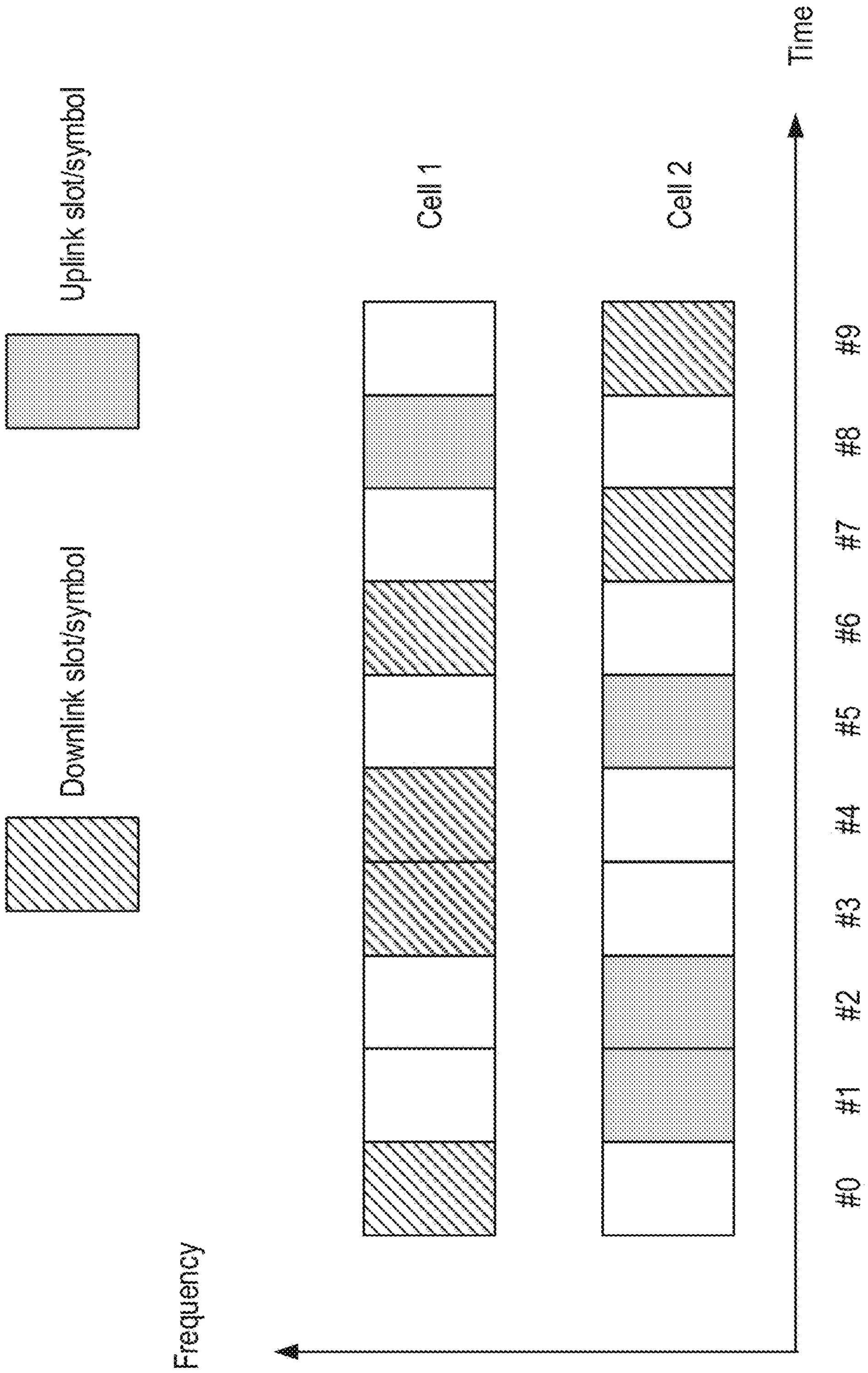
FIG. 5 shows a schematic diagram of an exemplary embodiment for wireless communication.

As a non-limiting exemplary example, FIG. 5 may be achieved according to FIG. 1B with a reference cell pattern. In some implementations, e.g., based on the alternative 1, the pattern bitmap is 1001101010, wherein bit "1" may refer to cell #1, and bit "0" may refer to cell #2. In some implementations, e.g., based on alternative 2, the pattern bitmap for cell 1 may be 1001101010, and/or the pattern bitmap for cell 2 may be 0110010101, wherein bit "1" indicates to be reference cell and bit "0" indicates not to be reference cell. In some implementations, the frame structure may be additional combined with the pattern to derive the actual frame structure. Various embodiments for these methods, compared with single TDD cell, may benefit from more D/U conversions.

Figure 6:
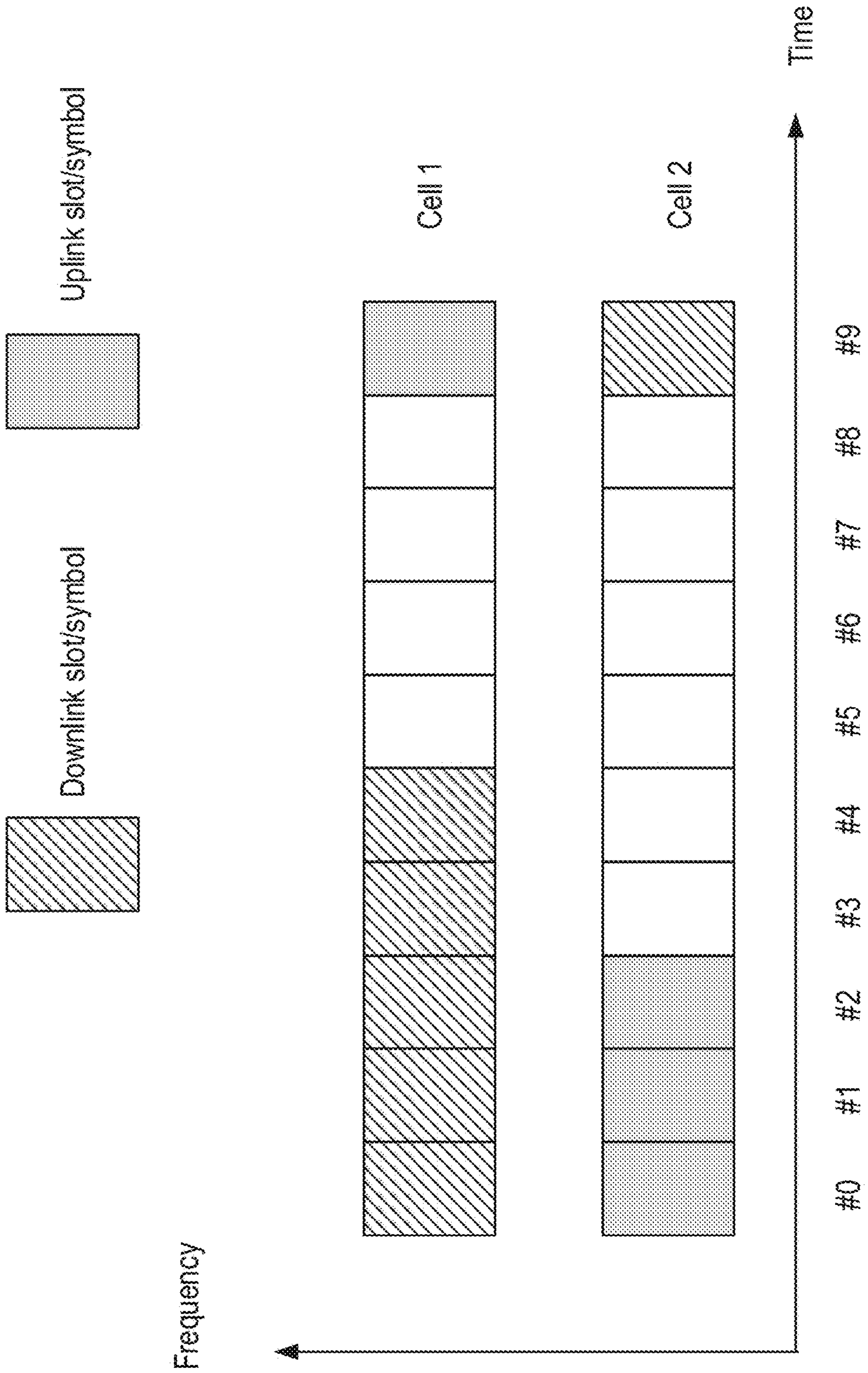
FIG. 6 shows a schematic diagram of an exemplary embodiment for wireless communication.
Figure 7:
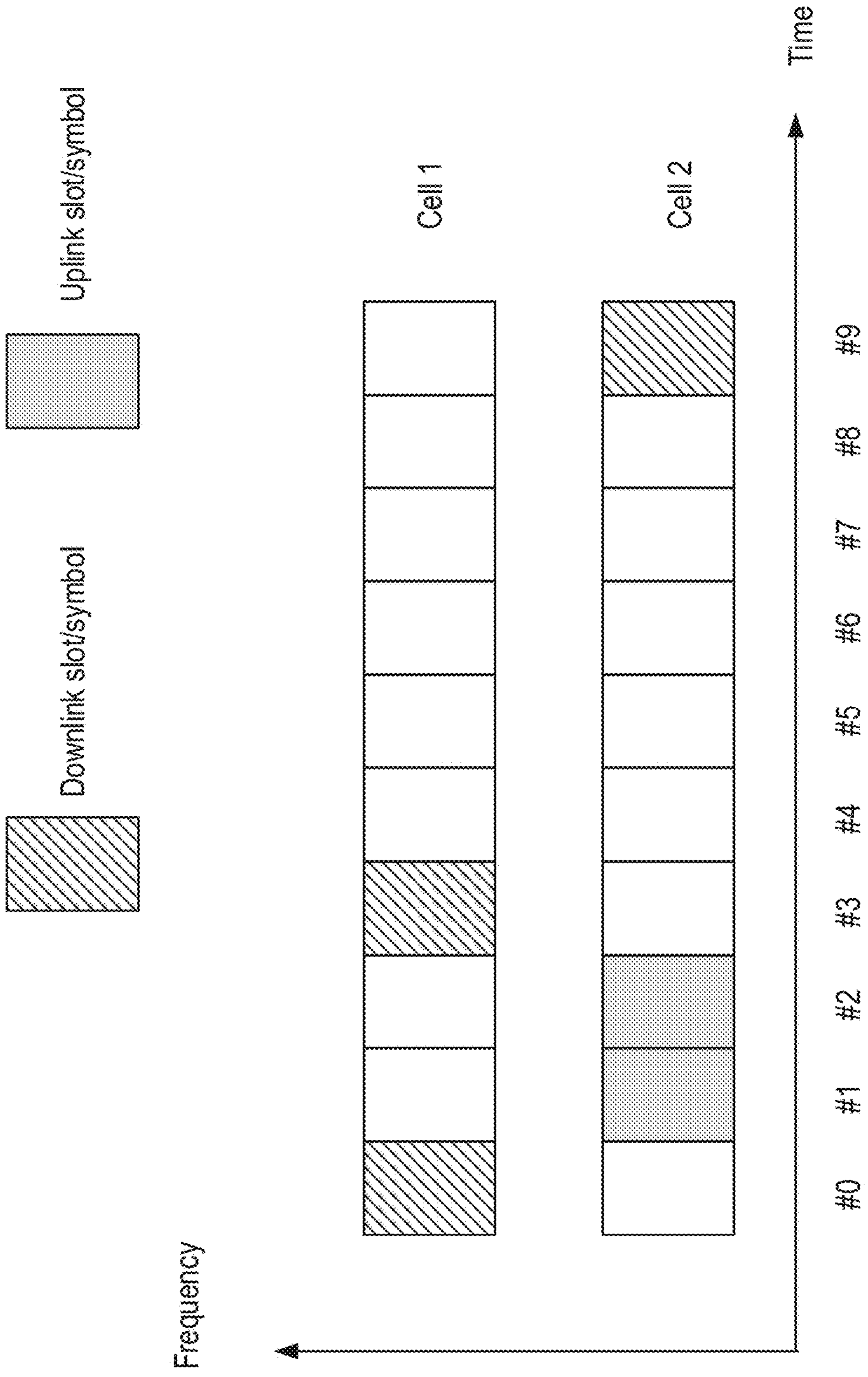
FIG. 7 shows a schematic diagram of an exemplary embodiment for wireless communication.

For another non-limiting exemplary example, FIG. 7 may be achieved by FIG. 6 with a reference pattern. Based on the alternative 1, the pattern bitmap may be 100100 applied for total 6 semi SFI D/U slots (slot #0, slot #1, slot #2, slot #3, slot #4, and slot #9), combined two cells. The frame structure is additional combined with the pattern to derive the actual frame structure. Then the overlapped slots/symbols which both are F may make CA-SBFD more useful.

In the present disclosure, the reference pattern may be determined by the symbol level, the slot level, or a combination of the slot level and the symbol level.

Figure 8:
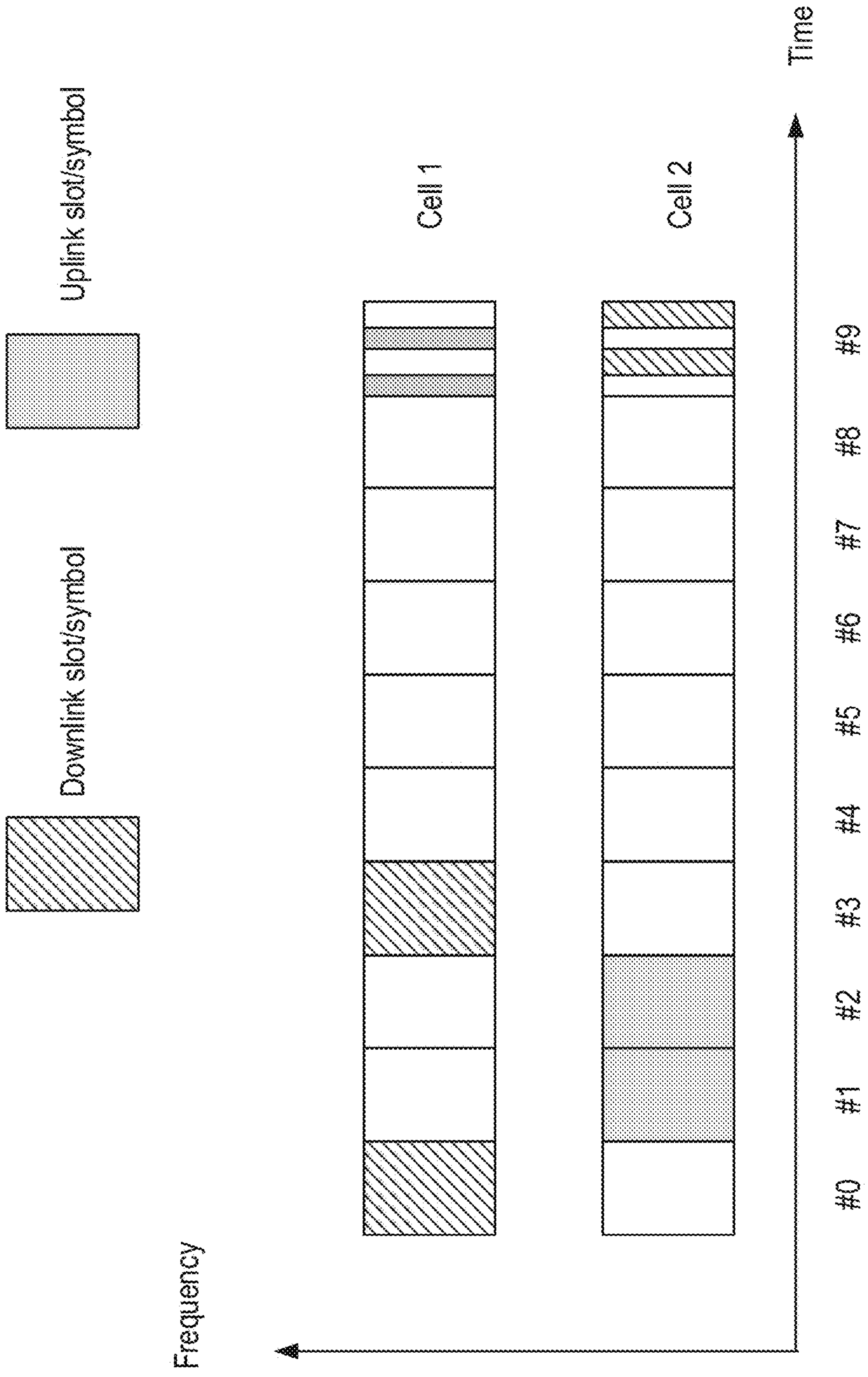
FIG. 8 shows a schematic diagram of an exemplary embodiment for wireless communication.

For another non-limiting exemplary example, the pattern bitmap for FIG. 4 may be 10010x, wherein x may be further represented by 14 bits symbol level bitmap, "11100001110000", as shown in FIG. 8. In some implementations, one or more slot (or every slot) may be further represented by 14 bits symbol level bitmap.

In some implementations, for the case of different subcarrier spacing (SCS) or different sub-slot, the present disclosure describes several options. An option 1, which may correspond to the alternative 1, may include using the cell with lowest SCS cell or slot granularity to configure the pattern. An option 2, which may correspond to the alternative 2, may include configuring the pattern for each cell, that is configuration is per slot per each cell. An option 3 may include using a cell to configure the pattern but the SCS may not be the lowest or configured with sub-slot. In some implementations, the pattern may not be permitted. In some implementations, the pattern may be configured by slot+symbol level. In some implementations, per sub-slot, the overlapped slot on other cell may be partial valid. In some implementations, per multi-subslot, the overlapped slot may align the slot boundary on other cell. In some implementations, symbols indicated in ssb-PositionsInBurst on reference and other cell(s) may not be impacted.

Method 2: Dynamic Indication/Switching of the Reference Cell

The present disclosure describes several alternative methods as below.

Alternative 1: Using GC DCI (e.g., format 2_0) to indication/switching of the reference cell. As a non-limiting exemplary example (referred as Alternative 1-1), indication may be SFI liked within a period, and combined with the alternative 1 or alternative 2 in the method 1, that is only for one cell or for each cell, and only for the semi SFI D/U slots/symbols with different direction. As another non-limiting exemplary example (referred as Alternative 1-2), when the switching indication is only on one cell, the method may include using 1 bit to indicate switching cell when two cells used as CA-SBFD, or using 2 bits when 3-4 cells are used. When the switching indication is on each cell, 1 bit indicates the cell itself used or not is enough or maybe an signal is also fine.

Alternative 2: Using a UE-specific DCI (e.g., format 1_1). As a non-limiting exemplary example (referred as Alternative 2-1), the method may include using CIF and without unicast scheduling, which may be used for reference cell indication. Other bits may be used similarly as the Alternative 1-1. As another non-limiting exemplary example (referred as Alternative 2-2), the method may include using a field in the DCI for scheduling unicast. The valid time for the indicated reference cell may be determined, such as based on the PDCCH or PDSCH or the PUCCH and optionally combined with an offset/timeline. In some implementations, the method may include using PUCCH cell indicator when based on PUCCH.

Method 3: Reference Cell Unchanged, Additional Pattern or Additional Collision Mechanism Indicated by DCI The present disclosure describes various implementations with reference cell unchanged, wherein additional pattern or additional collision mechanism may be further indicated by DCI.

As a non-limiting exemplary example, the method may include, similar steps as the Method 2, using additional update partial pattern, or using activation DCI to indicate DL SPS or CG PUSCH transmission.

As another non-limiting exemplary example, the method may include reference cell unchanged and additional pattern, which may be similar to the method 2. In some implementations, there is originally no pattern, and a DCI may only indicate additional pattern with a period or duration; and then, after the period or duration, it may recover back to no pattern or default pattern. In some implementations, the default pattern may refer to a pattern similar to the pattern described in any implementations of Method 2. In some implementations, another option may include using a DCI to indicate whether RRC U transmission or not. The DCI may be activation DCI, or any one of DL/UL DCI, optionally combined with a timeline. When multiple DCI are received before the collision transmission, the first or the last DCI may be used for determine the valid transmission.

As another non-limiting exemplary example, the method may include one of the two collision DL/UL DCI being enough to indicate one of DL/UL transmission, wherein each activation DCI may further indicate whether it is actual/prioritized transmission, further using last or first DCI to determine the valid DCI and optionally combined with a timeline.

The various embodiments in the present disclosure may achieve at least one of the following benefits. Based on HD CA to achieve SBFD, the various embodiments mainly resolve scenarios of semi SFI U collision with semi SFI D, or RRC U collision with semi SFI D/RRC D. For the scenario of dynamic U collision with dynamic D, network may avoid Dynamic D/U collision. With the various methods in the present disclosure, the UL transmission in the sub-band may be avoided to be always dropped or always with prioritized transmission, which is more flexible and coexisted with DL transmission.

Second Set of Exemplary Embodiments

Based on HD CA to achieve SBFD, in case of single cell, the original carrier (or DL BWP, or DL&UL BWP) may be regarded as one cell, the sub-band can be regarded as another cell, the enhanced collision resolution mechanism of intra-band HD CA may be used for the SBFD in single cell.

Figure 9:
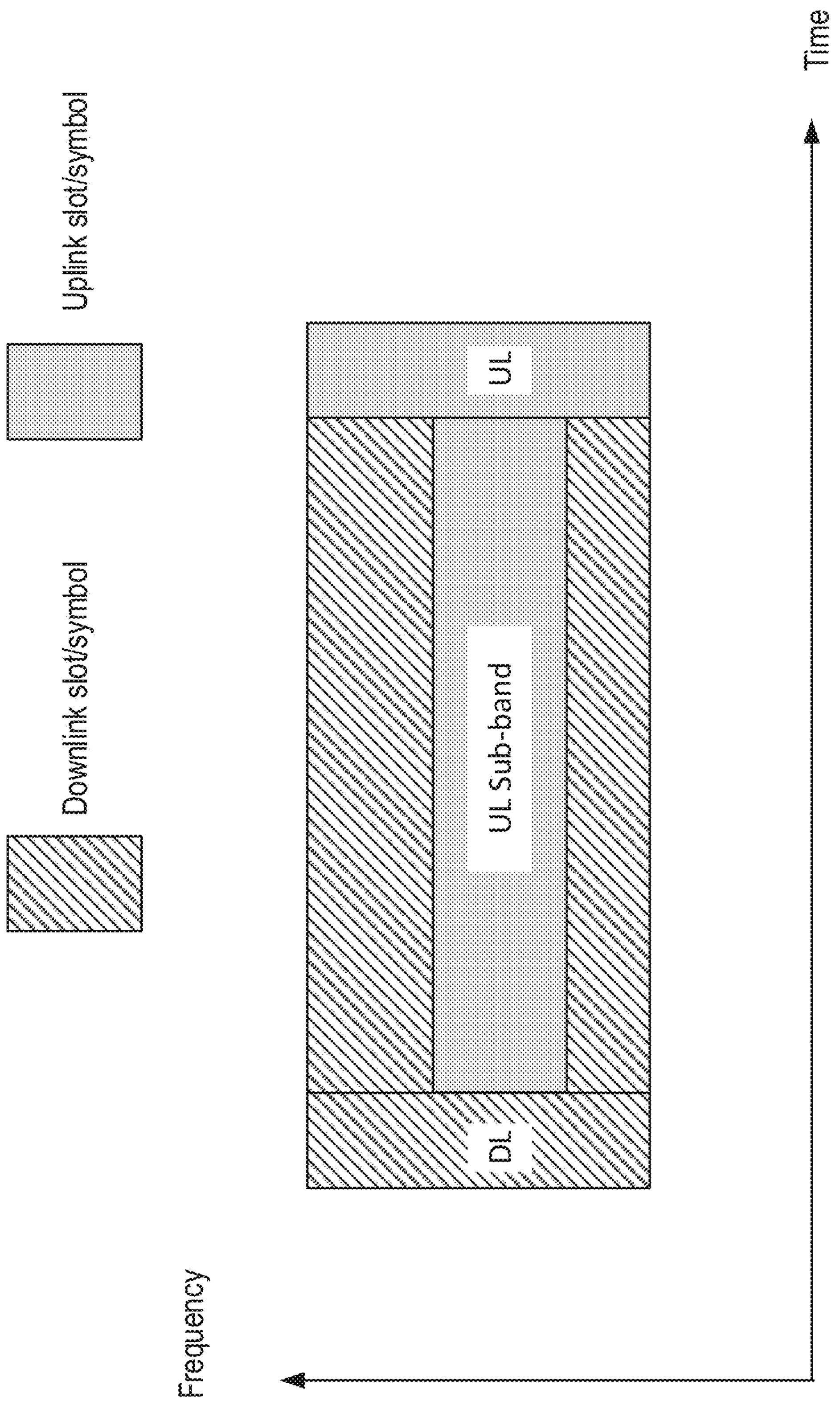
FIG. 9 shows a schematic diagram of an exemplary embodiment for wireless communication.

Referring to FIG. 9, an uplink (UL) sub-band may be configured in a downlink frequency resource. In some implementations, the method may include determining what type is the U resource in the configured UL sub-band. In some implementations, the sub-band is mainly used for UL transmission, and the UL sub-band is configured within the DL BWP. The frame structure in the DL BWP may be determined, for example, according to current specification, and/or the type of U resource in the UL sub-band may be regarded as one of following: semi SFI U or F or a type being aligned with the DL BWP in a same time domain.

In some implementations, when the type of U resource in the UL sub-band may be regarded as semi SFI U, whether/how to resolve the collision may be similar to steps in the first set of exemplary embodiments. When enhanced collision resolution mechanism is not implemented, U may be always dropped when its collision with semi D or RRC D.

In some implementations, when the type of U resource in the UL sub-band may be regarded as F, there may be no issue as similar to dynamic U collision with semi D or RRC D. In some implementations, to resolve RRC U collision with semi D or RRC D, the method may include similar steps as in the first set of exemplary embodiments. When enhanced collision resolution mechanism is not implemented, U may be always dropped when its collision with semi D or RRC D.

In some implementations, the type of U resource in the UL sub-band may be regarded as the type being aligned with DL BWP in same time domain. When the D slot/symbols is semi SFI D, the overlapped U resource in the UL sub-band is semi SFI U. For the F slot/symbols, the overlapped U resource in the UL sub-band may be regarded as F. Then, the enhanced collision resolution mechanism may be reused with similar steps as in the first set of exemplary embodiments.

The various embodiments in the present disclosure may achieve at least one of the following benefits. The uplink resource type of the sub-band may be determined. Based on similar mechanism for HD CA to achieve SBFD, the UL transmission in the sub-band may be avoided to be always dropped or always with prioritized transmission, providing more flexible and coexisted with DL transmission.

Third Set of Exemplary Embodiments

In the first set of exemplary embodiments and/or the second set of exemplary embodiments, a DCI format 2_0 (e.g., used for dynamic indicate SFI) may not be configured. When the SFI is configured and indicated to a UE, various embodiments may include determining how to use the SFI. In some implementations, the SFI indicated by the DCI format 2_0 may only impact the semi SFI F.

In case that the SFI is configured and indicated to a UE, the method of using the SFI may include one of following options. Option 1: transforming SFI D/U to one of following levels (e.g., Dynamic D and U), and participating the current collision handling. Option 2: Adding a new level for SFI D/U, define new collision cases.

Table 3 includes an example of collision resolution mechanism for SFI D/U with other types of resource.

TABLE 3

| Ref cell | Other cell | UE behavior | Note |
|---|---|---|---|
| Semi SFI D | SFI U | Allowed to drop U | Dropping U on other cell |
| Semi SFI U | SFI D | Allowed to drop D | Dropping U on other cell |
| RRC D | SFI U | Allowed to drop D | Dropping D on reference cell |
| RRC U | SFI D | Allowed to drop U | Dropping U on reference cell |
| Dynamic D | SFI U | Error | Error |
| Dynamic U | SFI D | Error | Error |

In various embodiments in the present disclosure, semi SFI D and U may include D and U symbols configured by TDD-UL-DL-ConfigurationCommon, or TDD-UL-DL-ConfigDedicated. Semi SFI F may include flexible symbols configured by TDD-UL-DL-ConfigurationCommon, or TDD-UL-DL-ConfigDedicated, when provided to a UE, or when TDD-UL-DL-ConfigurationCommon and TDD-UL- DL-ConfigDedicated are not provided to the UE. RRC D may include symbols corresponding to a higher-layer configured PDCCH, or a PDSCH, or a CSI-RS on semi SFI F of the same cell. RRC U may include symbols corresponding to a higher-layer configured SRS, or PUCCH, or PUSCH, or PRACH on semi SFI F of the same cell. Dynamic D and U may include symbols scheduled as D and U by DCI formats other than DCI format 2_0 on semi SFI F of the same cell.

In case that SFI is indicated, the reference cell pattern may be impacted by the following cases. Case 1: in response to the reference cell pattern not including any semi SFI F slots/symbols (no matter which is semi SFI F or overlapped with semi SFI F), the original reference cell pattern may not be impacted. Case 2: the reference cell pattern including the slots/symbols which is semi SFI D/U overlapped with semi SFI F, or is semi SFI F.

Figure 10:
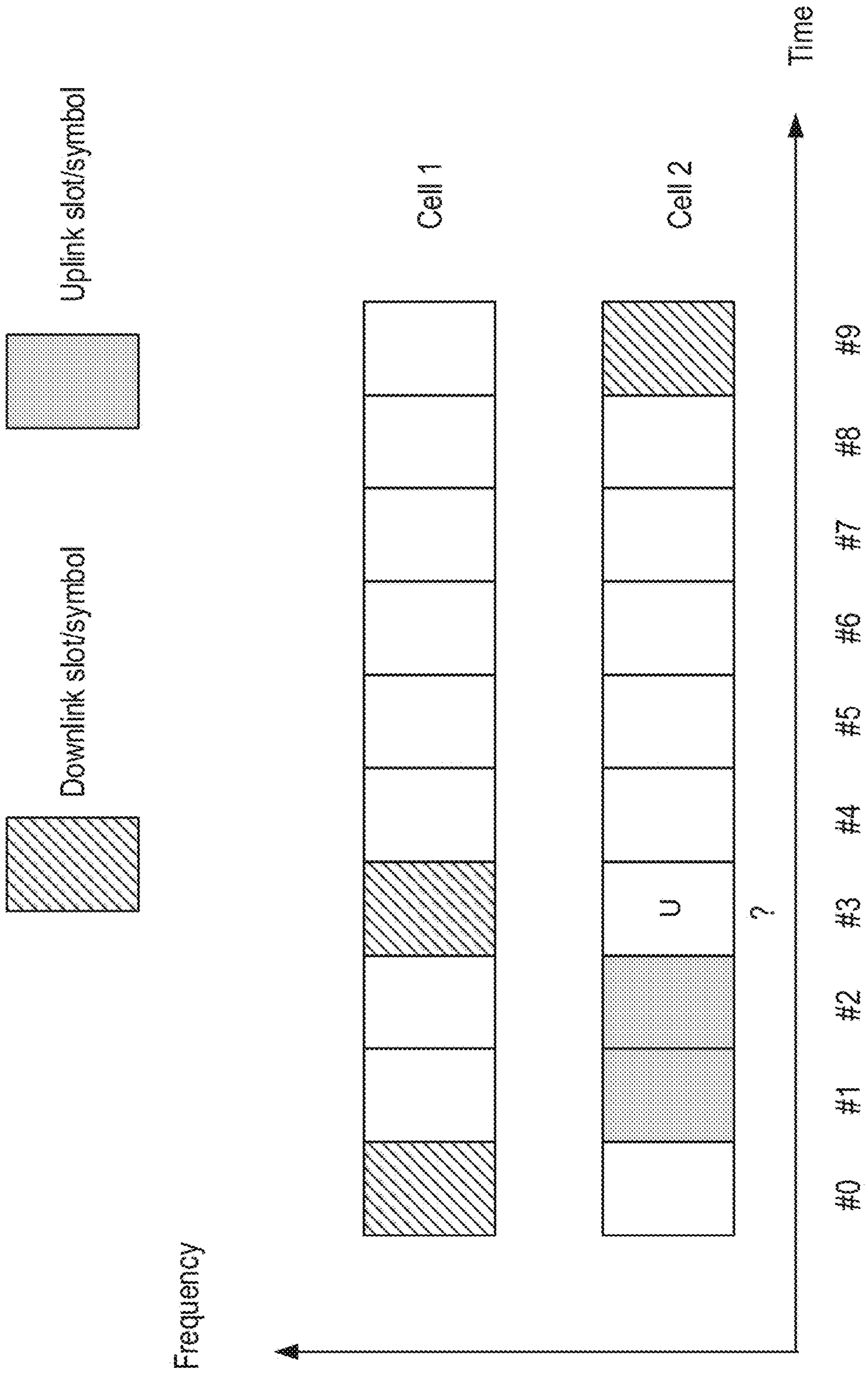
FIG. 10 shows a schematic diagram of an exemplary embodiment for wireless communication.

As a non-limiting exemplary example, FIG. 7 may be achieved by FIG. 6 with a reference pattern, and the pattern bitmap may be 100100 applied for total 6 semi SFI D/U slot combined two cells. Referring to FIG. 10, a SFI on cell2 indicates U for the slot #3, the method may include determining whether the original reference cell pattern may be impacted or not.

In some implementations, for Case 2, the method may include determining whether the original reference cell pattern may be impacted or not. For Case 1 and/or Case 2, the method may include determining whether/how to update the reference cell pattern with SFI. The resolution may be one of following options.

Option 1: The original reference cell pattern is not impacted. The reference cell pattern is prioritized and not impacted by SFI. That is original reference cell pattern applied for semi SFI F may be also applied for SFI D/U.

Option 2: The original reference cell pattern is impacted.

In some implementations, additional reference cell pattern may be indicated by SFI, only for partial slots/symbols (e.g., slots/symbols that are SFI D/U overlapped with semi SFI U/D on other cell). That is, direction collision may be updated by additional pattern.

In some implementations, partial original reference cell pattern (e.g semi SFI D/U overlapped with semi SFI F but updated to SFI D/U by SFI) is invalid. That is, no direction collision updated by SFI may make partial original pattern invalid.

In some implementations, default or implicitly update as reference cell from other cell. That is when the slots/symbols are indicated as SFI U which is original as other cell in the slots/symbols, the slots/symbols indicated as SFI U may be updated to reference cell implicitly.

The various embodiments in the present disclosure may achieve at least one of the following benefits. Using the resource in the sub-band may be more flexibly by additionally determined by SFI. Based on similar mechanism for HD CA to achieve SBFD, the UL transmission in the sub-band may be avoided to be always dropped or always with prioritized transmission, which is more flexible and coexisted with DL transmission.

The present disclosure describes various embodiments to resolve scenarios of semi SFI U collision with semi SFI D, or RRC U collision with semi SFI D/RRC D, based on Based on HD CA to achieve SBFD.

In various embodiments, Semi SFI U (RRC U) on other cell may be transmitted when overlapped with Semi SFI D (Semi SFI D or RRC D) on reference cell. Method 1 may include configuring a reference cell pattern. (1) The pattern may be configured with all Semi SFI D/U with different direction among the cells, or also including the slots/symbols on the other cell with RRC U which is overlapped with Semi SFI D or RRC D on reference cell. (2) The pattern may be configured based on one cell (e.g., lowest SCS or index cell) or for each cell. (3) above pattern may be determined by slot or symbol level or slot+symbols level. Method 2 may include dynamic indicating/switching reference cell. (1) GC-DCI, SFI liked indication within a period, or switching indication between/among two/multiple patterns. (2) UE-specific DCI, indication without unicast scheduling, or a field for reference cell indication combined with a timeline. Method 3 may include that reference cell unchanged, additional pattern or additional collision mechanism may be further indicated by DCI. In some implementations, various embodiments may include using method 2 to additional update partial pattern, or using activation DCI to indicate DL SPS or CG PUSCH transmission.

In various embodiments, when applied for UL sub-band based method, similar mechanism may be reused with {BWP and sub-band} instead of {cell #1 and cell #2}. Additional issues: what type is the U resource in the configured sub-band? Alt.1 similar as semi SFI U; Alt.2 similar as semi SFI F, further can be regarded as dynamic U; or RRC U; Alt.3 Align the type with DL BWP in same slots/symbols. (For the issue of semi SFI U or RRC U, same mechanism can be reused).

In various embodiments, when a DCI format 2_0 is detected, how to use the SFI? Option 1: transforming SFI D/U to one of following levels (e.g., Dynamic D and U), and participating the current collision handling. Option 2: Adding new level for SFI D/U, and defining new collision cases.

In various embodiments, when a DCI format 2_0 is detected, how/whether impact the reference cell pattern? Option 1: The original reference cell pattern may be not impacted. Option 2: The original reference cell pattern may be impacted. Alt.1 Additional reference cell pattern may be indicated by SFI, only for partial slots/symbols (e.g., slots/symbols that are SFI D/U overlapped with SFI U/D or semi SFI U/D on the other cell). Alt.2 Partial original reference cell pattern (e.g semi SFI D/U overlapped with semi SFI F but updated to SFI D/U by SFI) may be invalid. Alt.3 default/implicitly update the pattern to reference cell for the slots/symbols indicated by SFI U when original pattern for the same slots/symbols is the other cell.

In various embodiments, for the case of different SCS or different sub-slot, Option 1: using the cell with lowest SCS cell or slot granularity to configure the pattern. Option 2: configuring the pattern for each cell. Option 3: using a cell to configure the pattern but the SCS may be not the lowest or configured with sub-slot, alt.1 not permit; alt.2 configure the pattern by slot+symbol level. alt.3 per sub-slot, the overlapped slot on other cell may be partial valid; alt.4 per multi-subslot, which aligns the slot boundary on other cell.

The present disclosure describes methods, apparatus, and computer-readable medium for wireless communication. The present disclosure addressed the issues with configuring time-frequency resource in a half-duplex and/or full-duplex telecommunication system. The methods, devices, and computer-readable medium described in the present disclosure may facilitate the performance of wireless communication by resolving collision in configuring time-frequency resource in a half-duplex and/or full-duplex telecommunication system, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

receiving, by a user equipment (UE), a first message which is used to resolve a collision between a first transmission in a first frequency resource region and a second transmission in a second frequency resource region, wherein the first and second transmissions overlap in a time domain; and determining, by the UE based on the first message, to transmit one of the first transmission and the second transmission, wherein:

transmission directions of the first transmission and the second transmission are different, the first message indicates a frequency resource region pattern, or indicates a frequency resource region pattern in a set of pre-configured frequency resource region patterns, or indicates a frequency resource region as a reference frequency resource region, and the first message comprises the frequency resource region pattern for a set of slots or symbols, wherein the frequency resource region pattern indicates, for each of the set of slots or symbols, a reference frequency resource region between the first frequency resource region and the second frequency resource region.

2. The method according to claim 1, wherein:

the frequency resource region pattern is configured based the slots or symbols with different direction between frequency resource regions, or based the slots or symbols with overlapped semi-static transmissions with different direction.

3. The method according to claim 1, wherein:

the frequency resource region pattern comprises a pattern bitmap and the pattern is sent only on a frequency resource region, wherein each unit of the pattern bitmap indicates the frequency resource region at a corresponding slot or symbol.

4. The method according to claim 1, wherein:

the frequency resource region pattern comprises a pattern bitmap on each frequency resource region, wherein each bit of the pattern bitmap indicates whether the each frequency resource region at a corresponding slot or symbol is the reference frequency resource region.

5. The method according to claim 1, wherein:

the first message indicates whether to transmit the first transmission or the second transmission, wherein the first message is a DCI for activation or deactivation of the first transmission or the second transmission.

6. The method according to claim 1, wherein:

in response to the second frequency resource region being configured within the first frequency resource region, a type of resource in the second frequency resource region is determined by one of following:

the resource in the second frequency resource region is semi-static uplink slot or symbol, the resource in the second frequency resource region is semi-static flexible slot or symbol, or the resource in the second frequency resource region is semi-static uplink or flexible slot or symbol when corresponding same slot or symbol on the first frequency resource region is semi-static downlink or flexible slot or symbol, respectively.

7. The method according to claim 1, wherein:

the UE receives a DCI indicating an SFI; and a first collision resolution for a half-duplex UE configured with more than one frequency resource regions comprises one of the following:

to transform downlink or uplink indicated by the SFI to one of current type of transmission direction, and to use a second collision resolution, or as a new type for downlink or uplink indicated by the SFI, and to predefine the first collision resolution between the new type and each of current types of transmission direction.

8. The method according to claim 1, wherein:

the UE receives a DCI indicating an SFI and the frequency resource region pattern remains unchanged.

9. The method according to claim 1, wherein:

the UE receives a DCI indicating an SFI; and the frequency resource region pattern is changed by one of following:

being updated with a second frequency resource region pattern indicated by the DCI, being updated by invaliding the frequency resource region pattern on partial slots or symbols in the slots or symbols indicated to uplink or downlink slots or symbols by the DCI, or being updated by replacing the frequency resource region pattern on partial slots or symbols to the frequency resource region comprising the slots or symbols indicated to uplink or downlink slots or symbols by the DCI.

10. A method for wireless communication, comprising:

sending, by a base station, a first message which is used to resolve a collision between a first transmission in a first frequency resource region and a second transmission in a second frequency resource region; and wherein:

one of the first transmission and the second transmission is transmitted based on the first message, the first and second transmissions overlap in a time domain, and transmission directions of the first transmission and the second transmission are different, the first message indicates a frequency resource region pattern, or indicates a frequency resource region pattern in a set of pre-configured frequency resource region patterns, or indicates a frequency resource region as a reference frequency resource region, and the first message comprises the frequency resource region pattern for a set of slots or symbols, wherein the frequency resource region pattern indicates, for each of the set of slots or symbols, a reference frequency resource region between the first frequency resource region and the second frequency resource region.

11. The method according to claim 10, wherein:

the frequency resource region pattern is configured based the slots or symbols with different direction between frequency resource regions, or based the slots or symbols with overlapped semi-static transmissions with different direction.

12. The method according to claim 10, wherein:

the frequency resource region pattern comprises a pattern bitmap and the pattern is sent only on a frequency resource region, wherein each unit of the pattern bitmap indicates the frequency resource region at a corresponding slot or symbol.

13. The method according to claim 10, wherein:

the frequency resource region pattern comprises a pattern bitmap on each frequency resource region, wherein each bit of the pattern bitmap indicates whether the each frequency resource region at a corresponding slot or symbol is the reference frequency resource region.

14. The method according to claim 10, wherein:

in response to the second frequency resource region being configured within the first frequency resource region, a type of resource in the second frequency resource region is determined by one of following:

the resource in the second frequency resource region is semi-static uplink slot or symbol, the resource in the second frequency resource region is semi-static flexible slot or symbol, or the resource in the second frequency resource region is semi-static uplink or flexible slot or symbol when corresponding same slot or symbol on the first frequency resource region is semi-static downlink or flexible slot or symbol, respectively.

15. A wireless terminal device comprising:

a memory storing instructions; and a processor in communication with the memory, wherein, when the processor executes the instructions, the processor is configured to cause the wireless terminal device to perform:

receiving a first message which is used to resolve a collision between a first transmission in a first frequency resource region and a second transmission in a second frequency resource region, wherein the first and second transmissions overlap in a time domain; and determining, based on the first message, to transmit one of the first transmission and the second transmission, wherein:

transmission directions of the first transmission and the second transmission are different, the first message indicates a frequency resource region pattern, or indicates a frequency resource region pattern in a set of pre-configured frequency resource region patterns, or indicates a frequency resource region as a reference frequency resource region, and the first message comprises the frequency resource region pattern for a set of slots or symbols, wherein the frequency resource region pattern indicates, for each of the set of slots or symbols, a reference frequency resource region between the first frequency resource region and the second frequency resource region.

* * * * *